(12) United States Patent
Spielmann et al.

(10) Patent No.: US 9,662,949 B2
(45) Date of Patent: May 30, 2017

(54) LONGITUDINAL CONTROL ARM

(71) Applicant: SAF-HOLLAND GmbH, Bessenbach (DE)

(72) Inventors: Rolf Spielmann, Wertheim-Bettingen (DE); Matthias Hoppe, Mühlheim am Main (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/896,212

(22) PCT Filed: Jun. 17, 2014

(86) PCT No.: PCT/EP2014/062642
§ 371 (c)(1),
(2) Date: Dec. 4, 2015

(87) PCT Pub. No.: WO2014/202563
PCT Pub. Date: Dec. 24, 2014

(65) Prior Publication Data
US 2016/0152104 A1 Jun. 2, 2016

(30) Foreign Application Priority Data

Jun. 19, 2013 (DE) .................. 10 2013 211 468

(51) Int. Cl.
*B60G 7/02* (2006.01)
*B60G 7/00* (2006.01)
(Continued)

(52) U.S. Cl.
CPC ............. *B60G 7/001* (2013.01); *B60G 7/008* (2013.01); *B60G 7/02* (2013.01); *B60G 9/003* (2013.01);
(Continued)

(58) Field of Classification Search
CPC . B60G 7/001; B60G 9/02; B60G 7/02; B60G 7/008; B60G 9/003;
(Continued)

(56) References Cited

U.S. PATENT DOCUMENTS 5,203,585 A 4/1993 Pierce
5,375,871 A * 12/1994 Mitchell et al. ....... B60G 7/001
280/124.116
(Continued)

FOREIGN PATENT DOCUMENTS

CA 2727344 6/2012
DE 102005022745 10/2006
(Continued)

OTHER PUBLICATIONS

European Patent Office; International Search Report, Sep. 5, 2014.

*Primary Examiner* — Drew Brown
(74) *Attorney, Agent, or Firm* — Price Heneveld LLP (57) ABSTRACT

The invention relates to a longitudinal control arm for connection of an axle tube to a vehicle frame, the longitudinal control arm extending along a longitudinal direction and comprising an arrangement section on a frame side and at least one arrangement section on an axle tube side, a centerline of the arrangement section on the axle tube side being offset by an offset from a centerline of the arrangement section on the frame side when seen at an angle to the longitudinal direction.

14 Claims, 4 Drawing Sheets

(51) Int. Cl.
*B60G 9/00* (2006.01)
*B60G 9/02* (2006.01)

(52) U.S. Cl.
CPC .......... *B60G 9/02* (2013.01); *B60G 2200/31* (2013.01); *B60G 2204/143* (2013.01); *B60G 2204/148* (2013.01); *B60G 2206/012* (2013.01); *B60G 2206/10* (2013.01); *B60G 2206/8201* (2013.01)

(58) Field of Classification Search
CPC ........ B60G 2204/148; B60G 2206/012; B60G 2206/8201; B60G 2204/143; B60G 2200/31; B60G 2206/10
See application file for complete search history.

(56) References Cited

U.S. PATENT DOCUMENTS

| | | | | |
|---|---|---|---|---|
| 5,690,353 | A * | 11/1997 | Vandenberg | B60G 7/001 280/124.116 |
| 5,954,351 | A * | 9/1999 | Koschinat | B60G 9/003 280/124.116 |
| 6,834,874 | B1 * | 12/2004 | Overby | B60G 3/16 280/124.116 |
| 7,086,655 | B2 * | 8/2006 | Chan | B60G 7/001 280/124.116 |
| 7,347,435 | B2 * | 3/2008 | Chalin | B60G 7/001 280/124.11 |
| 7,360,774 | B2 | 4/2008 | Saieg et al. | |
| 8,317,209 | B2 * | 11/2012 | Aalderink | B60G 9/003 280/124.116 |
| 8,333,396 | B2 * | 12/2012 | Saieg | B60G 9/003 280/124.116 |
| 8,764,037 | B2 * | 7/2014 | Aalderink | B60G 7/008 280/124.11 |
| 8,998,229 | B2 * | 4/2015 | Michel | B60G 5/06 280/124.116 |
| 2004/0080132 | A1 * | 4/2004 | Chan | B60G 7/001 280/124.11 |
| 2006/0181047 | A1 | 8/2006 | Chamberlin et al. | |
| 2007/0158924 | A1 | 7/2007 | Peaker et al. | |
| 2009/0072505 | A1 * | 3/2009 | McGinnis | B60G 9/003 280/124.116 |
| 2012/0228847 | A1 | 9/2012 | Aalderink | |
| 2016/0176439 | A1 * | 6/2016 | Spielmann | B62D 65/00 280/124.103 |

FOREIGN PATENT DOCUMENTS

| | | |
|---|---|---|
| DE | 102006015671 | 10/2007 |
| DE | 102011086480 | 5/2013 |
| EP | 1728654 | 12/2006 |
| EP | 2397340 | 12/2011 |
| GB | 2396140 | 6/2004 |
| WO | 2007098927 | 9/2007 |

\* cited by examiner

LONGITUDINAL CONTROL ARM

BACKGROUND OF THE INVENTION

The present invention relates to a longitudinal control arm for connecting an axle tube to a vehicle frame, as well as a vehicle axle system, in particular for a utility vehicle.

Longitudinal control arms of the type in question are known in the prior art. They are used e.g. in rigid axle systems or steering axle systems of utility vehicles. They serve for connecting an axle tube to a vehicle or to a vehicle frame and ensure that the axle tube is guided laterally. In addition, they form part of the spring and damping system of the chassis, and as such they exhibit respective possibilities of connection for spring and damper elements. A disadvantage of the known longitudinal control arms, however, is that they are very large and heavy to build since it is required to transmit great forces. This additionally restricts the limited space conditions below the vehicle or below the vehicle frame. An optimum connection between the longitudinal control arm and the axle tube or between the longitudinal control arms and the vehicle frame is thus often not possible. Additionally, there are in most cases limitations on the use of wide-base tires, large drum brakes or also large disk brakes since the known longitudinal control arms build too wide. When used in steering axle systems, the steering angles, which may be realized, are in many cases inherently smaller than is desired.

Therefore, the object underlying the present invention is to provide a longitudinal control arm for connecting an axle tube to a vehicle frame, as well as a vehicle axle system, which do not exhibit the mentioned disadvantages and which allow for a more flexible arrangement of the longitudinal control arm(s) both on the vehicle frame and on the axle tube.

SUMMARY OF THE INVENTION

According to the invention, a longitudinal control arm is provided for connection of an axle tube to a vehicle frame, said longitudinal control arm extending along a longitudinal direction and comprising an arrangement section on the frame side and at least one arrangement section on the axle tube side, a centerline of the arrangement section on the axle tube side being offset or displaced by an offset from a centerline of the arrangement section on the frame side when seen at an angle or transverse to the longitudinal direction. As a matter of course, the longitudinal control arm may also be used on semi-trailers, trailers, etc. Axles or rigid axles for utility vehicles (as for semi-trailers, trailers, etc.), both controlled and uncontrolled, usually comprise an axle tube having an axle stub at either end. At the axle stubs, in turn, e.g. the brake system and the wheels etc. may be arranged. Such an axle is usually pivotably connected to the vehicle frame or to the chassis by means of two longitudinal control arms (sometimes also referred to as trailing arms). The longitudinal control arms are substantially oriented along the direction of travel. The longitudinal direction thus substantially corresponds to the direction of travel. The axle tube is arranged on the longitudinal control arms or in the latter substantially transverse or perpendicular to the longitudinal control arms or the direction of travel. The axle tube and the longitudinal control arm may be connected directly to one another, e.g. welded to each other. Alternatively preferably, between the longitudinal control arm and the axle tube, there is also arranged a wrap, which may reduce in particular the heat input into the axle tube during welding. For the arrangement on the frame or on the vehicle, the longitudinal control arm has the arrangement section on the frame side, for the arrangement on the axle tube or for the arrangement of the axle tube, it has the arrangement section on the axle tube side. The mentioned wrap may be arranged on the arrangement section on the axle tube side or within it, for example. The arrangement sections on the frame side and on the axle tube side are located at a distance from each other, wherein the distance substantially denotes the interval between fulcrums or centers of the arrangement sections. Depending on the installation position of the longitudinal control arm, the distance substantially runs approximately parallel to a horizontal plane, i.e. to the road surface. However, it may also run at an angle. This applies in the same manner to the longitudinal direction, which runs substantially along the distance. Transverse to the longitudinal direction, the arrangement sections on the frame side and on the axle tube side each have a width. Preferably, the arrangement section on the frame side is formed by a round, substantially circular opening, extending substantially transverse to the longitudinal direction. Preferably, the cross-section of the opening is indeed not round but oval, polygonal and/or angled, for example. Thus, in the arrangement sections on the frame side preferably rubber bearings or the like are used, which, substantially in the middle, usually have a round hole, through which an axle or the like may be passed. Advantageously, an outer contour of the rubber bearings is indeed not round or circular in order to prevent a rotation in the arrangement section on the frame side. Thus, advantageously, the arrangement section on the frame side may also be e.g. oval or polygonal. Transverse to the longitudinal direction, the arrangement section on the frame side or the inner contour thereof has the width, which is preferably substantially constant. The centerline of the arrangement section on the frame side intersects the contour substantially centrally or axis-symmetrically. Something similar applies to the arrangement section on the axle tube side, which preferably also represents an opening, extending substantially transverse to the longitudinal direction with the width. Preferably, the opening is substantially round or in particular also circular. Alternatively, the opening is also oval, polygonal and/or angled. The centerline of the arrangement section on the axle tube side divides the width substantially centrally or axis-symmetrically. The centerlines both of the arrangement section on the frame side and of the arrangement section on the axle tube side run substantially parallel to the longitudinal direction and are displaced by the offset. Expediently, the offset is in a range of 10 mm to 200 mm, preferably in a range of 30 mm to 150 mm, and most preferably in a range of about 40 mm to 100 mm. Expediently, a relationship of the offset to the distance between the arrangement sections on the axle tube side and on the frame side is in a range of about 0.01 to 0.4, preferably in a range of about 0.04 to 0.3, and most preferably in a range of about 0.05 to 0.2. Preferably, thus, the arrangement sections on the frame side and on the axle tube side along the longitudinal direction or along the direction of travel are not on a line or are not aligned. Advantageously, due to the offset, the longitudinal control arm may so to say get out of the way of other objects. Expediently, the offset may be achieved by means of different widths of the arrangement section on the axle tube side and of the arrangement section on the frame side. In this case, the longitudinal control arm along the longitudinal direction may substantially have the same width, wherein so to say only the arrangement sections are displaced or offset relative to each other or also only the centerlines thereof. Alternatively preferably, the arrangement sections on the frame side and on the axle tube side also have the same width, wherein in this case the shape of the longitudinal control arm along the longitudinal direction determines the offset. For example, the longitudinal control arm in a top plan view (in the mounted state when viewed onto the road surface) approximately assumes an S shape. Advantageously, such an S shape may as a matter of course also be combined with arrangement sections having different widths. Advantageously, thus, this allows for a highly flexible adaption to the space conditions below the vehicle. Apart from the space utilization, the longitudinal control arm(s) also make(s) it possible to optimize the force flows. Also preferably, the longitudinal control arm allows for different supporting widths on the vehicle and on the axle tube. Here, the term supporting width defines the distance between two respective arrangement sections (on the frame side and/or on the axle tube side) of two adjacent longitudinal control arms transverse to the longitudinal direction. Advantageously, thus, due to the offset, different supporting widths may be achieved. The distance between two arrangement sections on the frame side thus advantageously is not the same as that between the arrangement sections on the axle tube side. Advantageously, the supporting width on the vehicle is larger than the supporting width on the axle tube, alternatively preferably also vice versa. The broad support on the vehicle allows for a very stable bearing of the entire structure. Thus, it is very advantageous if the centerline of the arrangement section on the axle tube side is displaced by the offset from the centerline of the arrangement section on the frame side relative to a chassis or vehicle centerline. This allows for the largest possible support of the longitudinal control arms on the vehicle while at the same time building space is gained, for wide-base tires, for example. When used in a steering axle embodiment, apart from the broad support on the vehicle and the possible use of wide-base tires, additionally a considerably larger steering angle or wheel angle is possible. The additional building space gained on the outside, thus, is not only of benefit for wider tires, but may also be used in order to more easily adapt larger or wider drum brakes or longer disk brakes or to make it easier to mount them. As a matter of course, it is also possible to arrange two longitudinal control arms, which have the offset, such that the supporting width on the vehicle is the same as on the axle tube.

Preferably, the longitudinal control arm is formed as a hollow profile at least in regions, wherein the hollow profile preferably has a cross-section, which increases in the direction of the arrangement section on the frame side at least in regions. Preferably, the hollow profile is a box section welded together from individual parts. Particularly preferably, the hollow profile is however made by means of an internal high pressure forming process. Advantageously, the cross-section of the hollow profile increases at least in regions in the direction of the arrangement section on the frame side. Preferably, thus a very rigid design of the arrangement section on the frame side is possible. The longitudinal control arm is advantageously formed such that it has a dirt-repellent design with no undercuts, formation of hollows and recesses etc., making it possible to prevent a damaging accumulation of dirt in the form of stones, dust and saltwater. A further advantage of a transition-less and closed shape of a longitudinal control arm is a low-resistance, streamlined design, which counteracts extreme air turbulence below the vehicle. Preferably, by means of the internal high pressure forming process, the wall thickness may be adapted flexibly to the expected load on the longitudinal control arm. Also preferably, the longitudinal control arm may also be designed as a lattice. Also by using a lattice structure, an optimum orientation based on the forces applied is made possible. It is very advantageous to combine such a lattice structure with the offset between the centerlines of the arrangement sections on the frame side and on the axle tube side. In combination, thus, a very light, rigid and highly flexible design of the longitudinal control arm is made possible. In addition, the combination of the offset with a longitudinal control arm manufactured by means of an internal high pressure forming process is particularly preferred.

Advantageously, the longitudinal control arm transverse to a horizontal plane has a curvature, wherein the curvature preferably extends between the arrangement section on the axle tube side and the arrangement section on the frame side. The horizontal plane expediently corresponds to a plane, on which there are positioned the swivel axis of the arrangement section on the frame side and the central axis of the arrangement section on the axle tube side, and in particular substantially of the road surface. Advantageously, the curvature extends to the entire longitudinal control arm or the entire cross-section thereof, i.e. not only to an upper edge of the longitudinal control arm, for example. Very advantageously, the curvature forms so to say a free space below it or between the arrangement sections on the frame side and on the axle tube side. Thus, the curvature serves to connect the arrangement sections on the frame side and on the axle tube side not directly, i.e. straight in a beeline, but so to say in an arc, wherein the arc or the curvature extends between the arrangement sections on the axle tube side and on the frame side. Preferably, the arc or the curvature extends away from the horizontal plane. Thus, on the one hand, a very high ground clearance may be achieved, on the other hand, additional space is created for other assemblies below the vehicle. Alternatively preferably, the mentioned advantages and features may however be realized in that the arc or the curvature extends straight to the horizontal plane. Under certain circumstances, although ground clearance is reduced hereby, the spring deflection may be increased considerably, since the space requirement of the longitudinal control arm towards the top is minimal. The actual design of the curvature will thus advantageously depend on the intended use or usage site of the respective vehicle. As a matter of course, the arc need not extend continuously between the arrangement sections on the axle tube side and on the frame side. For example, it is possible that only one section of the longitudinal control arm between the arrangement section on the frame side and the arrangement section on the axle tube side is deflected substantially transverse to the horizontal plane towards the top or towards the bottom in order to create additional building space between the two arrangement sections.

Advantageously, the curvature or the arc has a maximum extension substantially transverse to the horizontal plane departing from the fulcrum of the arrangement section on the frame side, which is preferably in a range of about 50 mm to 200 mm. The extension is measured perpendicular to the distance between the fulcrums or centers of the arrangement sections on the frame side and on the axle tube side. Preferably, a relationship of the extension to the distance between the two arrangement sections is in a range of about 0.1 to 0.5, particularly preferably in a range of about 0.2 to 0.3.

Further preferably, the longitudinal control arm has an upper support part and a lower support part, wherein the upper support part and the lower support part, in particular the separating surface or contact surface thereof, form a parting plane, which is at an angle to the horizontal plane. Advantageously, the parting plane runs through the arrangement section on the axle tube side. Particularly preferably, also through the fulcrum or center of the arrangement section on the axle tube side. Preferably, thus, the parting plane intersects the arrangement section on the axle tube side. To put it differently, the longitudinal control arm is thus divided in the area of the arrangement section on the axle tube side. Advantageously, the angle between the parting plane and the horizontal plane is about 180° in a preferred embodiment. The parting plane is thus preferably substantially parallel to the horizontal plane or to the road surface. This is particularly preferable for the force flow from the longitudinal control arm to the axle tube and in this context for the connection to the axle tube. The upper support part and the lower support part need not necessarily be connected to one another. Both may be connected to the axle tube, for example, in a form-fitting and/or force-fitting manner without touching each other. Advantageously, however, the upper support part and the lower support part are connected to one another by means of at least one contact surface. Preferably, the contact surface is located within the parting plane or forms a part thereof.

Expediently, the upper support part and/or the lower support part each have an arrangement section on the axle tube side, wherein the arrangement section(s) on the axle tube side has/have an angle of enlacement <180°. Advantageously, thus, the arrangement section on the axle tube side of the longitudinal control arm is formed by the arrangement sections on the axle tube side of the upper support part and of the lower support part. All advantages and features already mentioned with regard to the arrangement sections apply. The division into the upper support part and into the lower support part or the use of at least two arrangement sections on the axle tube side advantageously makes it possible that e.g. the arrangement section on the axle tube side of the upper support part is designed wider than that of the lower part or vice versa. Expediently, thus, the force flow may be optimized. A big advantage of an angle of enlacement <180° is that the axle tube need not be moved into the longitudinal control arm, but that the longitudinal control arm or the upper support parts or the lower support parts may be put onto the axle tube. As a matter of course, also a longitudinal control arm, which is not formed from an upper support part and from a lower support part, may have an angle of enlacement <180°. Advantageously, however, by using the upper support part, which each have an angle of enlacement <180°, in sum an angle of enlacement may again be achieved, which is >180°.

Expediently, the upper support part and/or the lower support part is/are connected to an adapter plate in a form-fitting and/or force-fitting manner, wherein the adapter plate is connected in a form-fitting and/or force-fitting manner to a bearing surface adapted to arrange a spring/damper element. In this variant, the longitudinal control arm thus is designed so to say three-piece in sum, wherein the three parts are connected to one another by means of the adapter plate. As a matter of course, the longitudinal control arm may also be formed as a single piece, wherein in this case, the bearing surface is a part of the longitudinal control arm. Also advantageously, the bearing surface may also be a part of the lower support part or a part of the upper support part. Preferably, the upper support part, the lower support part, and/or also the bearing surface are butt-welded to the adapter plate. Preferably, however, the adapter plate may also have an opening, through which the lower support part, the upper support part, and/or the bearing surface may pass, which allows for circumferential welding (along the outer contour of the mentioned parts) to the adapter plate. Very advantageously, it is also possible to screw the mentioned parts to the adapter plate. Also the upper support part and the lower support part may be screwed to each other. Also preferably, the adapter plate makes it possible to combine different materials. For example, the longitudinal control arm or the upper support part, and/or the lower support part may be made from a steel or aluminum material, while a bearing surface made from a composite or compound material may be arranged on the adapter plate in a form-fitting and/or force-fitting manner by means of suitable screwed joints.

Expediently, on the arrangement section on the axle tube side, for connecting the axle tube and/or the wrap, the longitudinal control arm has at least one projection, extending substantially along the axle tube. Advantageously, the projection has the same angle of enlacement as the longitudinal control arm or the upper support part or the lower support part. As a matter of course, circumferentially about the axle tube more than one projection may be arranged. Moreover, an arrangement is possible to either side of the longitudinal control arm or of the arrangement section on the axle tube side. In a preferred embodiment with a parting plane substantially parallel to the horizontal plane, preferably a projection is arranged on the upper support part, on either side of the control arm. The projection may be welded to the longitudinal control arm or to the upper support part and/or to the lower support part. Advantageously, however, also the mentioned components themselves may form the projection. In this case, the projection need not be attached extra. Advantageously, the projection has a contact area towards the axle tube or towards the wrap. Advantageously, the contact area substantially forms a line contact, not a surface contact. The same applies to the arrangement towards the longitudinal control arm. Also here, advantageously, a line contact is provided. Expediently, the projection is in contact with the component to be connected or arranged neither with its entire width nor with its entire height. Due to the very favorable force transmission into the axle tube, the longitudinal control arm, which has the projection(s), may be connected to the axle tube advantageously without the wrap. As a matter of course, the longitudinal control arm also has at least one projection on the arrangement section on the frame side. All advantages and features apply in the same manner.

Expediently, the at least one projection connects the longitudinal control arm and the axle tube and/or the wrap in an arc. Advantageously, here, the arc extends substantially transverse to the longitudinal direction from the longitudinal control arm to the axle tube. The arc may be concave or convex. Advantageously, it is designed such that a force flow between the axle tube and the longitudinal control arm may be optimized. To put it differently, the arc represents a connection between the two line contacts so to say. The arc allows for a very stiff attachment of the axle tube. In addition, due to the projection, it is possible to increase so to say the width of the arrangement section on the axle tube side. The load peaks on the axle tube decrease. Furthermore, the force flow between the longitudinal control arm and the axle tube is reduced since the projection provides an additional "force path" by means of the line contact. It should be noted that it would also be possible that the connection between the longitudinal control arm and the axle tube is also exclusively possible by means of the projection(s), i.e. that the original or actual arrangement section on the axle tube side of the longitudinal control arm does no longer have a direct contact with the axle tube. Advantageously, the longitudinal control arm and the axle tube are welded together along the projection at least in regions. As a matter of course, the projection may also be welded to the wrap.

Expediently, at either side of the arrangement section on the axle tube side a projection is arranged, wherein the two projections preferably have different widths. The width is measured substantially transverse to the longitudinal direction and along the axle tube. Advantageously, by using projections of different widths, the offset of the centerline of the arrangement section on the frame side from the centerline of the arrangement section on the axle tube side may be varied further. Advantageously, this allows for an even more flexible design of the longitudinal control arm. The projection advantageously has a (maximum) height transverse to the longitudinal direction and to the width of the projection. Expediently, there is a height/width relationship of the projection in a range of about 0.2 to 1.8, preferably of about 0.7 to 1.8, and most preferably of about 0.8 to 1.2.

According to the invention, there is provided a vehicle axle system, in particular for a utility vehicle, with a longitudinal control arm for connecting an axle tube to a vehicle frame, wherein the longitudinal control arm extends along a longitudinal direction and has an arrangement section on the frame side and at least one arrangement section on the axle tube side, wherein a centerline of the arrangement section on the axle tube side is displaced by an offset from a centerline of the arrangement section on the axle tube side when seen transverse to the longitudinal direction. As a matter of course, all advantages and features of the longitudinal control arm according to the invention apply also to the vehicle axle system of the invention and vice versa.

Further advantages and features become apparent from the following description of preferred embodiments of the longitudinal control arm of the invention and of the vehicle axle system of the invention with reference to the appended Figures. Individual features of the individual embodiments may be combined with each other within the scope of the invention.

BRIEF DESCRIPTION OF THE DRAWINGS

The Figures show.

DETAILED DESCRIPTION OF THE PREFERRED EMBODIMENTS

Figure 1:
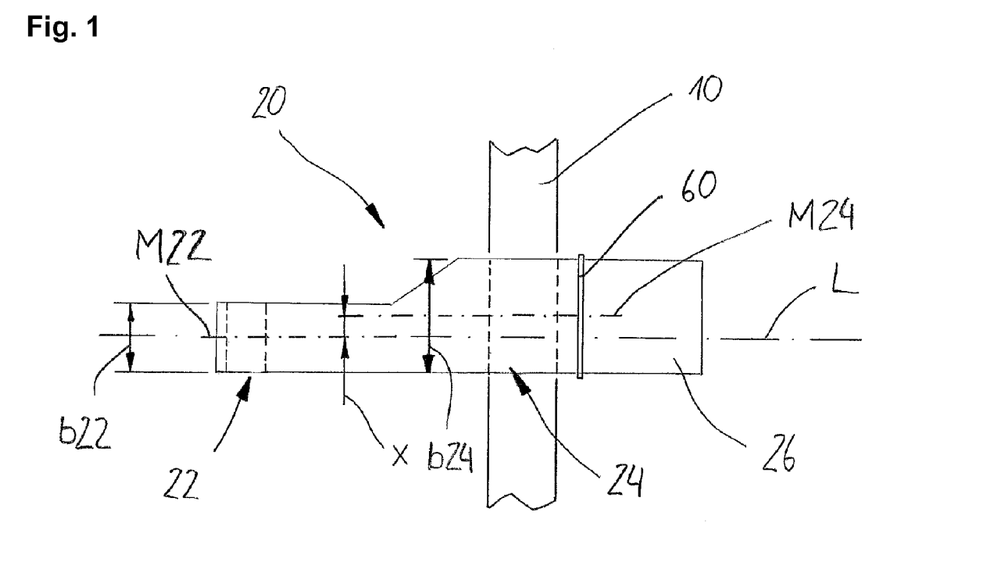
FIG. 1 shows a schematic representation of a preferred embodiment of a longitudinal control arm in a top plan view.

FIG. 1 shows a schematic representation of a longitudinal control arm 20 in a top plan view (onto a road surface). The longitudinal control arm 20 has an arrangement section 22 on the frame side and an arrangement section 24 on the axle tube side along a longitudinal axis L. A centerline M22 of the arrangement section on the frame side is displaced by an offset x from a centerline M24 of the arrangement section on the axle tube side. Within the arrangement section 24 on the axle tube side, an axle tube 10 is arranged. A width b22 of the arrangement section 22 on the frame side is considerably narrower than a width b24 of the arrangement section 24 on the axle tube side. This difference leads after all to the offset x. The longitudinal control arm 20 is connected to a bearing surface 26 by means of an adapter plate 60.

Figure 2:
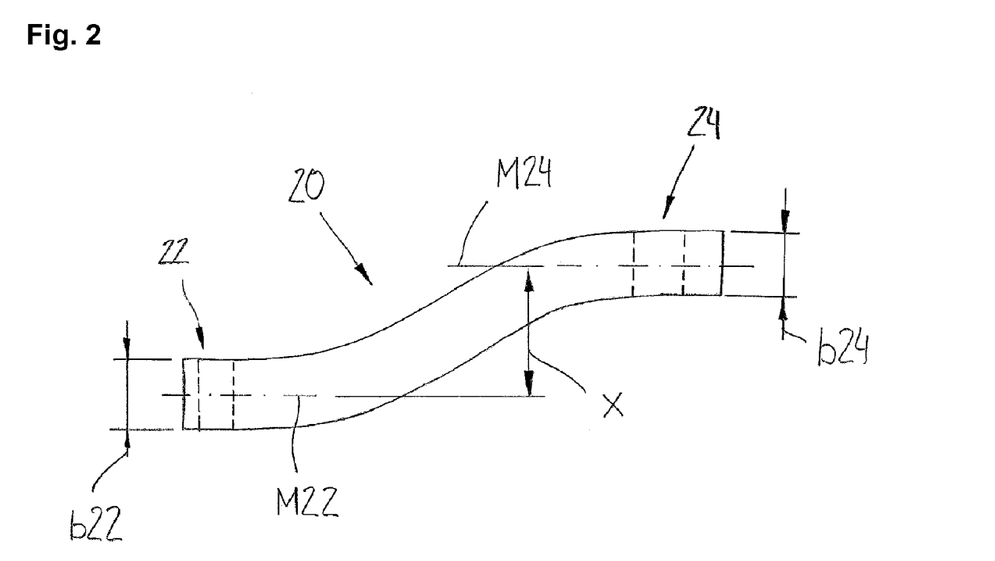
FIG. 2 shows a schematic representation of a preferred embodiment of a longitudinal control arm with arrangement sections of the same width and with an offset.

FIG. 2 shows a schematic representation of a preferred embodiment of a longitudinal control arm 20 in a top plan view. An arrangement section 22 on the frame side has a width b22, corresponding approximately to a width b24 of an arrangement section 24 on the axle tube side. A centerline M22 of the arrangement section 22 on the frame side is displaced by an offset x from a centerline M24 of the arrangement section 24 on the axle tube side. The offset x is achieved in this case by the S shape of the longitudinal control arm 20.

Figure 3:
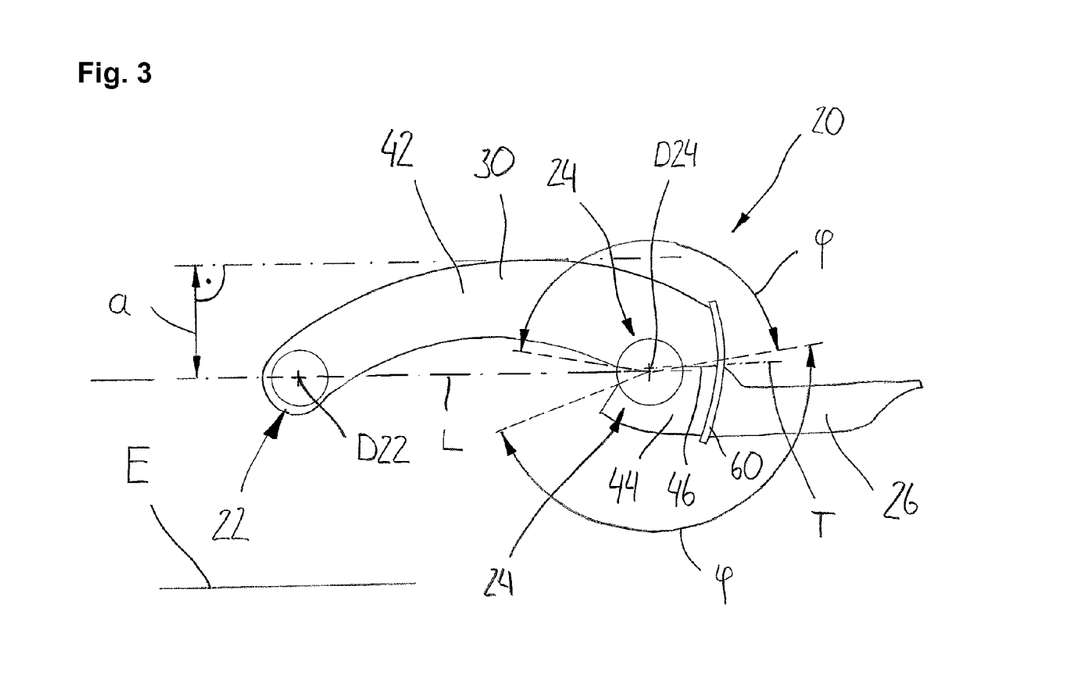
FIG. 3 shows a schematic representation of a preferred embodiment of a longitudinal control arm in a side view.

FIG. 3 shows a further preferred embodiment of a longitudinal control arm 20 in a side view. A longitudinal control arm 20 comprises an upper support part 42 having a curvature 30, as well as a lower support part 44. The curvature 30 has a maximum extension a, wherein the extension is measured perpendicular to the distance between the fulcrums or centers D22 and D24 of the arrangement section 22 on the frame side and of the arrangement section 24 on the axle tube side. In the embodiment shown in FIG. 3, the distance between the fulcrums or centers D22 and D24 is oriented substantially parallel to the longitudinal direction L as well as to a horizontal plane E. The upper support part 42 as well as the lower support part 44 are connected by means of a common contact surface 46 positioned within a parting plane T. The parting plane T or the contact surface 46 is substantially parallel to the horizontal plane E. Both the upper support part 42 and the lower support part 44, with their respective arrangement sections 24 on the axle tube side, enlace an axle tube (not shown here) with angles of enlacement <180°. Apart from the contact surface 46, the upper support part 42 and the lower support part 44 are connected by means of an adapter plate 60. Furthermore, a bearing surface 26 is arranged on the adapter plate 60, which serves for arranging a spring/damper element, such as an air bellows. The entire longitudinal control arm 20 extends substantially along the longitudinal direction L, which is oriented substantially parallel to the horizontal plane E.

Figure 4:
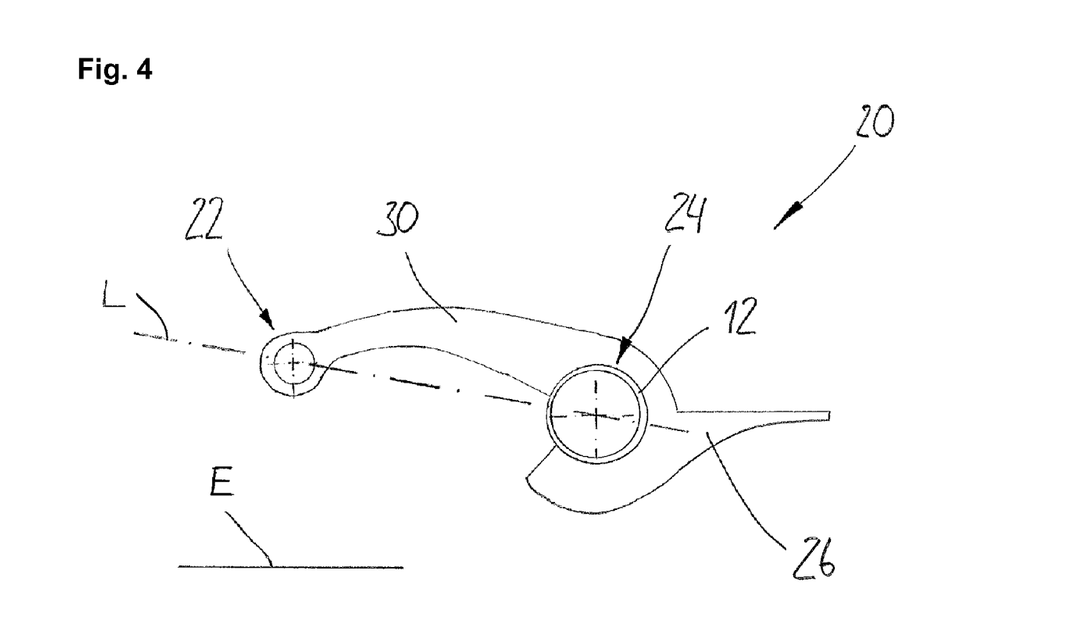
FIG. 4 shows a schematic representation of a preferred embodiment of a longitudinal control arm in a side view with a wrap.

FIG. 4 shows a further preferred embodiment of a longitudinal control arm 20 in a side view. The longitudinal control arm 20 may be connected to an axle tube (not shown here) by means of a wrap 12. The wrap 12 is connected by means of an arrangement section 24 on the axle tube side of the longitudinal control arm 20, wherein an angle of enlacement >180° is realized. The longitudinal control arm 20 is designed completely single-piece in the embodiment shown and, at its rear end, it forms a bearing surface 26 and, between the arrangement section 24 on the axle tube side and an arrangement section 22 on the frame side, it forms a curvature 30. The curvature 30 extends substantially away from a horizontal plane E.

Figure 5:
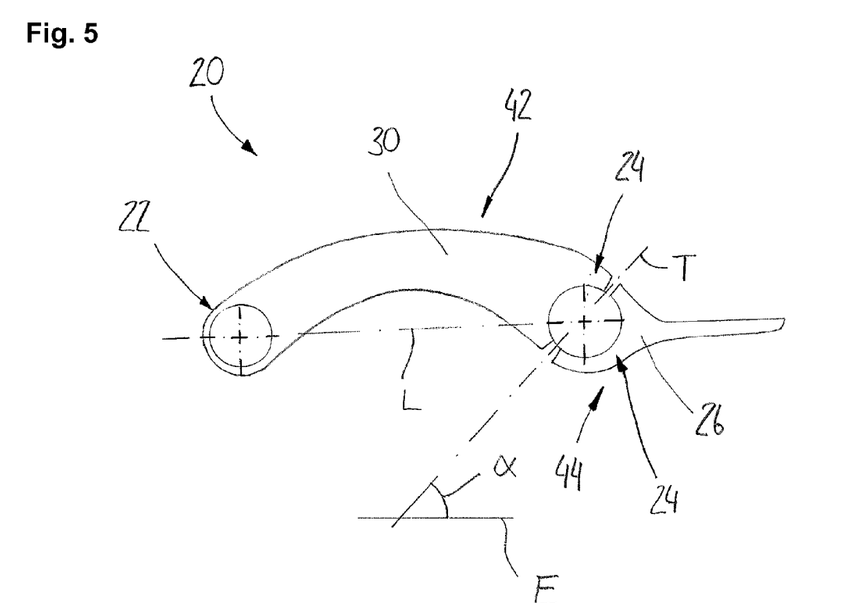
FIG. 5 shows a schematic representation of a preferred embodiment of a longitudinal control arm with an upper support part and a lower support part.

FIG. 5 shows a further preferred embodiment of a longitudinal control arm 20 in a side view. The longitudinal control arm 20 has an upper support part 42 and a lower support part 44, which with their respective arrangement sections 24 on the axle tube side form a parting plane T. The lower support part 44 further has a bearing surface 26. The parting plane T forms an angle α with a horizontal plane E. The upper support part 42 further has an arrangement section 22 on the frame side. Between the arrangement section 22 on the frame side and the arrangement section 24 on the axle tube side of the upper support part 42, a curvature 30 is formed, which so to say creates a free space between the arrangement section 22 on the frame side and the arrangement section 24 on the axle tube side. The upper support part 42 as well as the lower support part 44 are not directly connected to each other in the embodiment shown in FIG. 5.

Figure 6:
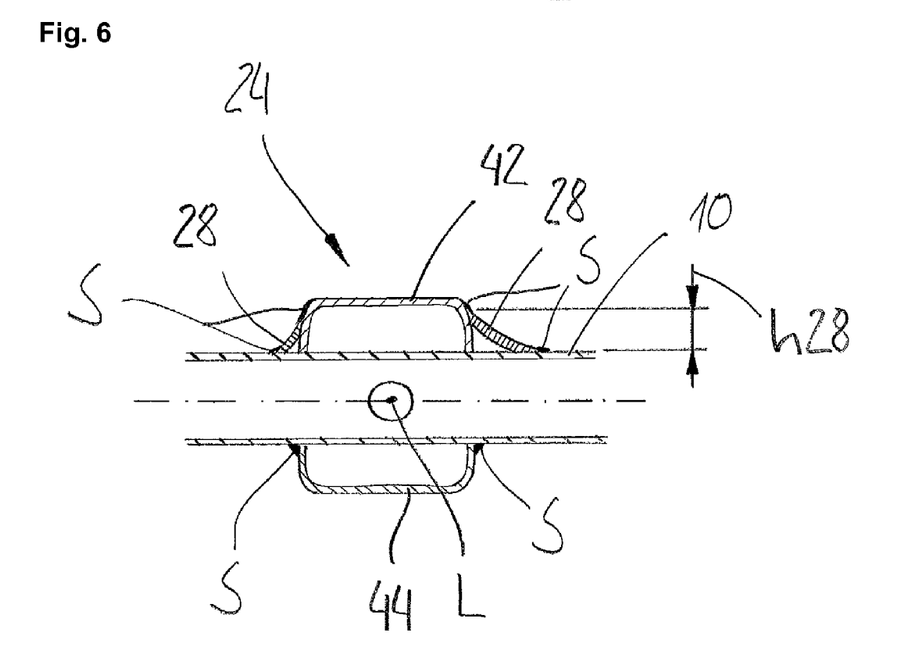
FIG. 6 shows a sectional view of a preferred embodiment of an arrangement section on the axle tube side.

FIG. 6 shows a preferred embodiment of an arrangement section 24 on the axle tube side in a sectional view transverse to a longitudinal direction L and along an axle tube 10. The longitudinal control arm comprises an upper support part 42 as well as a lower support part 44. The lower support part 44 is directly welded to the axle tube 10 via welded joints S. The upper support part 42 has one projection 28 on either side, which projections extend substantially concavely from the upper support part 42 to the axle tube 10. Transverse to the axle tube 10 and to the longitudinal axis L, the projections have a height h28. In the embodiment shown in FIG. 6, also the two projections 28 are connected to the axle tube 10 by means of welded joints S. As a matter of course, the projections 28 may also represent or have a rather convex or straight shape in cross-section. Here, it also becomes apparent that the two projections 28 do not have a surface contact but a line contact with the axle tube 10 or with the upper support part 42. The welding is advantageously done along the line contact. FIG. 6 further shows that now a force may be transmitted into the axle tube 10 from above at four sites due to the fact that in addition to the two (contact) sites of the upper support part 42 there are also the two (contact) sites of the projections 28. As a matter of course, force could be transmitted by means of the projections 28 alone. It is further clearly visible that along the axle tube 10 the two projections have different widths.

Figure 7:
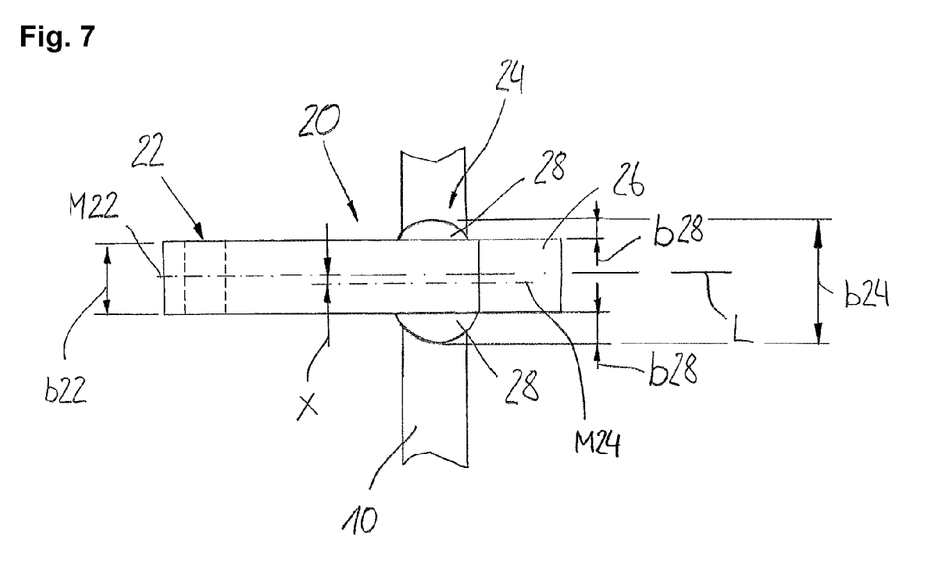
FIG. 7 shows a schematic representation of a preferred embodiment of a longitudinal control arm with two projections in a top plan view.

FIG. 7 shows a further preferred embodiment of a longitudinal control arm 20 in a top plan view. The longitudinal control arm 20 has an arrangement section 22 on the frame side as well as an arrangement section 24 on the axle tube side. On either side of the arrangement section 24 on the axle tube side, one projection 28 is arranged, wherein the widths b28 of the projections 28 are designed differently. As a consequence, a centerline M24 of the arrangement section 24 on the axle tube side is oriented displaced by an offset x from a centerline M22 of the arrangement section 22 on the frame side. As a matter of course, projections 28 of different widths may also be combined with longitudinal control arms 20, which already have in themselves the offset x between the arrangement section 22 on the frame side and the arrangement section 24 on the axle tube side. In the present case, the offset x is realized by the projections 28 of different widths. Indeed, the two arrangement sections would have approximately the same width due to the shape of the longitudinal control arm, which is constant in the longitudinal direction L. By using projections 28 of different widths, a width b24 of the arrangement section 24 on the axle tube side may now be designed wider than a width b22 of the arrangement section on the frame side.

LIST OF REFERENCE SIGNS 10 axle tube
12 wrap
20 longitudinal control arm
22 arrangement section on the frame side
24 arrangement section on the axle tube side
26 bearing surface
28 projection
30 curvature
42 upper support part
44 lower support part
46 contact surface
60 adapter plate
D22, D24 fulcrums
E horizontal plane
S welded joint
T parting plane
L longitudinal direction
M22, M24 centerlines
a extension
b22 width of the arrangement section on the frame side
b24 width of the arrangement section on the axle tube side
b28 width of the projection
h28 height of the projection
x offset
φ angle of enlacement
α angle of the planes

The invention claimed is:

1. A longitudinal control arm for connection of an axle tube to a vehicle frame, said longitudinal control arm extending along a longitudinal direction and comprising:
    an arrangement section on a frame side; and
    at least one arrangement section on an axle tube side;
    wherein a centerline of the arrangement section on the axle tube side is offset or displaced by an offset from a centerline of the arrangement section on the frame side when seen at an angle to the longitudinal direction;
    wherein the longitudinal control arm comprises a box section with a hollow profile at least in regions;
    wherein the longitudinal control arm has an upper support part and a lower support part;
    wherein the lower support part includes a bearing surface configured to support a damper element;
    wherein at least one of the upper support part and the lower support part include the arrangement section on the axle tube side; and
    wherein the arrangement section on the axle tube side has an angle of enlacement of less than 180°; and
    wherein the upper support part and the lower support part form a parting plane, which is positioned at an angle relative to the horizontal plane.

2. The longitudinal control arm of claim 1, wherein the hollow profile preferably has a cross-section, which increases at least in regions in the direction of the arrangement section on the frame side.

3. The longitudinal control arm of claim 2, wherein the longitudinal control arm has a curvature transverse to a horizontal plane, and wherein the curvature preferably extends between the arrangement section on the axle tube side and the arrangement section on the frame side.

4. The longitudinal control arm of claim 3, wherein the upper support part and the lower support part form a parting plane, which is positioned at an angle relative to the horizontal plane.

5. A longitudinal control arm for connection of an axle tube to a vehicle frame, said longitudinal control arm extending along a longitudinal direction and comprising:
    an arrangement section on a frame side; and
    at least one arrangement section on an axle tube side;
    wherein a centerline of the arrangement section on the axle tube side is offset or displaced by an offset from a centerline of the arrangement section on the frame side when seen at an angle to the longitudinal direction;

wherein the longitudinal control arm comprises a hollow profile at least in regions;

wherein the longitudinal control arm has an upper support part and a lower support part;

wherein at least one of the upper support part and the lower support part each has an arrangement section on the axle tube side;

wherein the arrangement section on the axle tube side has an angle of enlacement of less than 180°, and, wherein at least one of the upper support part and the lower support part is connected to an adapter plate in at least one of a form-fitting and a force-fitting manner, and wherein the adapter plate is connected to a bearing surface in a form-fitting manner, and wherein the bearing surface is adapted for the arrangement of a spring/damper element and is at least one of form-fit connected and force-fit connected to a bearing surface.

6. The longitudinal control arm of claim 5, wherein, on the arrangement section on the axle tube side, for connecting at least one of the axle tube and a wrap, the longitudinal control arm has at least one projection extending substantially along the axle tube.

7. The longitudinal control arm of claim 6, wherein the at least one projection connects the longitudinal control arm and the at least one of the axle tube and the wrap in an arc.

8. The longitudinal control arm of claim 7, wherein the projection is arranged on either side of the arrangement section on the axle tube side, and wherein the two projections have different widths.

9. The longitudinal control arm of claim 1, wherein the longitudinal control arm has a curvature transverse to a horizontal plane, and wherein the curvature preferably extends between the arrangement section on the axle tube side and the arrangement section on the frame side.

10. The longitudinal control arm of claim 1, wherein, on the arrangement section on the axle tube side, for connecting at least one of the axle tube and a wrap, the longitudinal control arm has at least one projection extending substantially along the axle tube.

11. The longitudinal control arm of claim 10, wherein the at least one projection connects the longitudinal control arm and the at least one of the axle tube and the wrap in an arc.

12. The longitudinal control arm of claim 10, wherein the projection is arranged on either side of the arrangement section on the axle tube side, and wherein the two projections have different widths.

13. A vehicle axle system, comprising a longitudinal control arm according to claim 1.

14. The longitudinal control arm of claim 1, wherein the box section has a rectangular cross-sectional configuration.

* * * * *